May 1, 1934. M. T. THOMPSON 1,957,372
SLEIGH RUNNER
Filed July 6, 1932
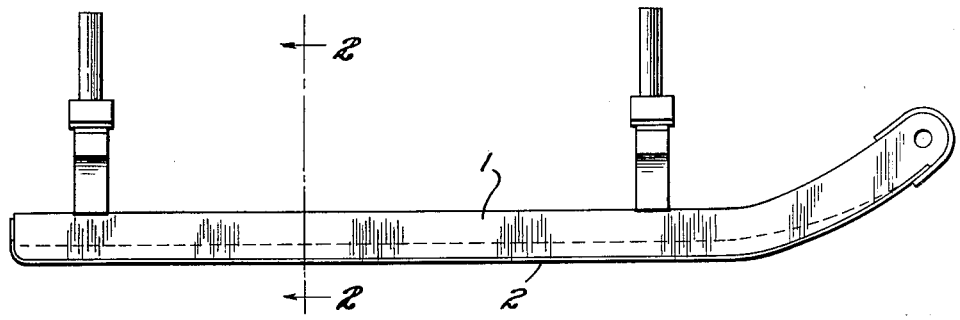
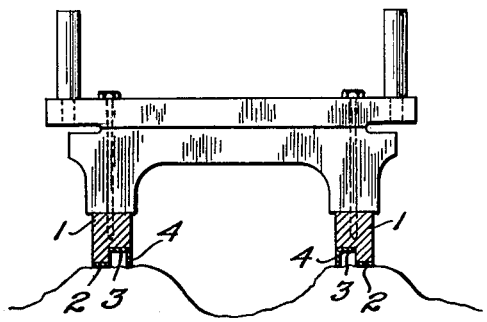
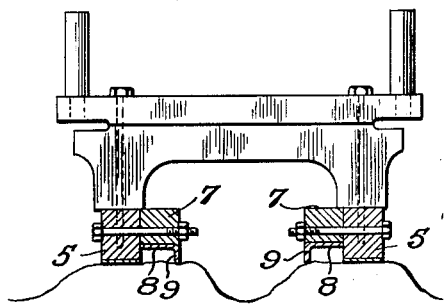
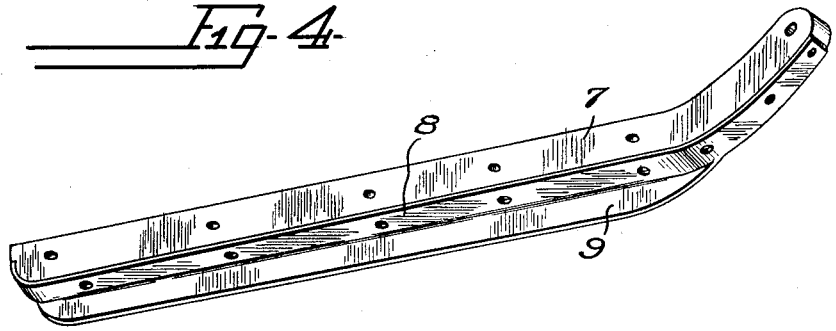
M. T. Thompson,
INVENTOR
BY Victor J. Evans & Co.
ATTORNEY
WITNESS:
H. J. Meader Patented May 1, 1934

1,957,372

UNITED STATES PATENT OFFICE 1,957,372

SLEIGH RUNNER

Morris T. Thompson, Turtleford, Saskatchewan, Canada

Application July 6, 1932, Serial No. 621,069

1 Claim. (Cl. 280—28)

My present invention has reference to sleds, and especially to the runners therefor, and the object of the invention is the provision of runners for sleds which will prevent the sleds from sluing or moving sidewise when traveling over snowy surfaces, regardless of the depressions which may have been occasioned in such surfaces.

A further object is the provision of the runner for a sled which has its inner and lower or active edge provided, inward of its shoe, with a longitudinal groove that is shod by an angle metal plate, the depending element of the said plate serving as a biting or gripping element with the icy or snowy surface to firmly engage therewith and to prevent the sluing of the said sled.

A further and important object is the provision of an anti-sluing runner for bob sleds, which are intended for carrying heavy loads, in which the runner, without materially complicating the same, is formed or has attached thereto an anti-sluing element or device.

A still further object of the invention is the provision of an anti-sluing or skidding device for sled runners which may be attached to the ordinary runner.

The specification is a specific disclosure of the improvement, while the claim defines the actual scope thereof.

Reference is to be had to the accompanying drawing forming part of this specification and in which similar characters of reference indicate corresponding parts throughout the several views.

In the drawing:

Figure 1 is a side elevation of a bob sled having runners in accordance with this invention.

Figure 2 is a transverse sectional view therethrough on the line 2—2 of Figure 1.

Figure 3 is a view substantially similar to Figure 2 but illustrating the anti-sluing device attached to an ordinary runner.

Figure 4 is a perspective view of the improvement as disclosed by Figure 3.

In the drawing 1 indicates the runners of the sled, which, together with the other parts of the sled may be of any desired construction. The runners 1 are shod with metal plates 2.

In the showing of Figures 1 and 2 of the drawing the runners, upon their inner and lower corners, are grooved longitudinally and in the upper wall provided by this groove there is secured the upper element 3 of a strong angle metal plate. The depending side 4 of the angle plate is arranged in a plane with the inner side of the runner 1. This construction, it will be noted, affords a groove between the shoe 2 and the depending and biting element 4 of the angle plate so that the outer edge of this flange 4 will contact with the icy or snowy ground surface over which the sled travels and by biting engagement therewith will prevent the lateral moving or sluing of the sled. As disclosed by Figure 2 of the drawing the sled will travel on the elevated surfaces between the depressions made by other sleds which have traveled on the icy surface before the sled equipped with the improvement and it will be apparent that a sled equipped with my improvement cannot slue or move sidewise and the sled will not sink into such depressions.

In Figures 3 and 4 the runners 5 for the sled are of the ordinary construction and are metal shod. To the inner faces of these runners 5 I bolt or otherwise secure the metal bars 7 of the improvement. The inner faces of the bars have bolted thereon the horizontal flanges 8 of angle metal plates. The plates, of course, are sufficiently strong for accomplishing their purpose and the plates on their inner edges are formed with downwardly extending flanges 9 and the said flanges afford biting elements which contact with the snow or icy surface and prevent the sluing or lateral movement of the sled.

Various changes in form, proportion and minor details of my invention may be resorted to without departing from the spirit and scope thereof. Hence I consider myself entitled to all such variations as may fall within the scope of the appended claim.

Having described the invention, I claim:

A sleigh runner comprising an elongated body having a tread surface extending substantially the full length thereof, a bar engaging the side face of the body and extending the full length of the tread surface and having the lower face thereof arranged in a plane above said tread surface, an angle iron element having the horizontal portion secured to the lower face of the bar and having the free edge of the vertical portion thereof arranged in a plane with the tread surface and spaced therefrom to provide a groove lying between said body and the angle iron element and extending the full length of the tread surface, and a fastener securing the bar to the body and arranged above the groove.

MORRIS T. THOMPSON.